United States Patent
Whittle et al.

(10) Patent No.: US 11,591,921 B1
(45) Date of Patent: Feb. 28, 2023

(54) CERAMIC MATRIX COMPOSITE VANE ASSEMBLY

(71) Applicant: Rolls-Royce plc, London (GB)

(72) Inventors: Michael J. Whittle, Derby (GB); Andrew T. Holt, Derby (GB); Roderick M. Townes, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/519,822

(22) Filed: Nov. 5, 2021

(51) Int. Cl.
  *F01D 9/04* (2006.01)
  *F01D 5/14* (2006.01)
(52) U.S. Cl.
  CPC .............. *F01D 9/042* (2013.01); *F01D 5/141* (2013.01); *F01D 5/147* (2013.01); *F01D 9/04* (2013.01); *F01D 9/041* (2013.01); *F05D 2220/32* (2013.01); *F05D 2240/12* (2013.01)
(58) Field of Classification Search
  CPC .......... F01D 9/042; F01D 5/141; F01D 5/147; F01D 5/18; F01D 5/284; F01D 9/04; F01D 9/041; F01D 25/246; F05D 2220/32; F05D 2240/12
  See application file for complete search history.

(56) References Cited

U.S. PATENT DOCUMENTS

| | | | |
|---|---|---|---|
| 3,302,926 A | 2/1967 | Bobo | |
| 4,126,405 A | 11/1978 | Bobo et al. | |
| 4,422,229 A | 12/1983 | Sadler et al. | |
| 6,398,489 B1 | 6/2002 | Burdgick et al. | |
| 6,929,445 B2 * | 8/2005 | Zatorski | F01D 5/188 415/115 |
| 7,452,189 B2 | 11/2008 | Shi et al. | |
| 7,540,709 B1 | 6/2009 | Ebert | |
| 7,785,075 B2 | 8/2010 | Botrel et al. | |
| 7,824,152 B2 | 11/2010 | Morrison | |
| 8,240,986 B1 | 8/2012 | Ebert | |
| 8,371,812 B2 | 2/2013 | Manteiga et al. | |
| 8,511,980 B2 | 8/2013 | Propheter-Hinckley et al. | |
| 8,668,440 B2 | 3/2014 | Butler et al. | |
| 8,864,451 B2 | 10/2014 | Piggott et al. | |
| 9,017,013 B2 | 4/2015 | Laurello et al. | |
| 9,309,783 B2 | 4/2016 | Nallam et al. | |
| 9,617,867 B2 | 4/2017 | Maekawa et al. | |
| 9,631,515 B2 | 4/2017 | Oyarbide et al. | |
| 9,863,254 B2 | 1/2018 | Ceglio et al. | |
| 9,915,159 B2 * | 3/2018 | Huizenga | F01D 25/162 |
| 10,030,538 B2 | 7/2018 | Hernandez et al. | |
| 10,053,998 B2 | 8/2018 | Vo et al. | |
| 10,233,764 B2 | 3/2019 | Thomas et al. | |

(Continued)

FOREIGN PATENT DOCUMENTS

WO 2011047693 4/2011

OTHER PUBLICATIONS

High Temp. CMC Nozzles for 65% Efficiency, General Electric Company (2017) (21 pages).

*Primary Examiner* — Juan G Flores
*Assistant Examiner* — Brian Christopher Delrue
(74) *Attorney, Agent, or Firm* — Barnes & Thornburg LLP (57) ABSTRACT

A turbine assembly for use with a gas turbine engine includes a bladed wheel assembly and a vane assembly. The bladed wheel assembly is adapted to interact with gases flowing through a gas path of the gas turbine engine. The vane assembly is located upstream of the bladed wheel assembly and adapted to direct the gases at the bladed wheel assembly.

20 Claims, 6 Drawing Sheets

(56) References Cited

U.S. PATENT DOCUMENTS

| | | |
|---|---|---|
| 10,280,756 B2 | 5/2019 | Nash et al. |
| 10,370,301 B2 | 8/2019 | Chamberlain et al. |
| 10,508,549 B2 | 12/2019 | Balzer et al. |
| 10,767,497 B2 * | 9/2020 | Vetters ................. F01D 25/005 |
| 10,774,665 B2 | 9/2020 | Greene et al. |
| 10,883,376 B2 * | 1/2021 | Whittle ................... F01D 5/284 |
| 11,092,023 B2 * | 8/2021 | Huizenga ................ F01D 9/041 |
| 2002/0187040 A1 | 12/2002 | Premore |
| 2009/0238683 A1 | 9/2009 | Alvanos et al. |
| 2012/0279631 A1 | 11/2012 | Mizokami et al. |
| 2013/0315725 A1 * | 11/2013 | Uechi .................... F01D 5/188 |
| | | 415/208.1 |
| 2016/0177761 A1 * | 6/2016 | Huizenga ................ F01D 25/16 |
| | | 415/209.3 |
| 2016/0290147 A1 | 10/2016 | Weaver |
| 2017/0051619 A1 | 2/2017 | Tuertscher |
| 2017/0081966 A1 * | 3/2017 | Huizenga ................ F01D 25/12 |
| 2017/0204734 A1 * | 7/2017 | Groves, II ............. F01D 9/065 |
| 2019/0368360 A1 * | 12/2019 | Freeman ................. F01D 9/042 |
| 2020/0131092 A1 * | 4/2020 | de Diego ................ F01D 9/041 |
| 2020/0131919 A1 * | 4/2020 | de Diego .......... C04B 35/62863 |
| 2020/0386103 A1 * | 12/2020 | Generale ................. F01D 5/186 |

\* cited by examiner

CERAMIC MATRIX COMPOSITE VANE ASSEMBLY

FIELD OF THE DISCLOSURE

The present disclosure relates generally to gas turbine engines, and more specifically to guide vane assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Turbines typically include alternating stages of static vane assemblies and rotating wheel assemblies. Blades and vanes in the turbine may be exposed to extremely hot temperatures by virtue of being located downstream of the combustor. Some vanes are constructed from metallic materials which may need to be relatively thick to withstand the high temperatures in the turbine. Thicker vanes typically result in larger vanes and a larger overall weight of the gas turbine engine.

Some vane may include ceramic matrix composite materials to withstand the high temperatures and decrease the overall weight of the gas turbine engine. However, in ceramic matrix composite vane embodiments, structural loads on the ceramic matrix composite material may cause the ceramic matrix composite materials to break. As such, turbine vane structure and shape remain an area of interest for ceramic matrix composite components.

SUMMARY

The present disclosure may comprise one or more of the following features and combinations thereof.

In accordance with one aspect of the present disclosure, a vane assembly extends circumferentially around a central reference axis of a gas turbine engine and includes an outer wall, an inner wall, and a plurality of vanes extending between the outer wall and the inner wall. The outer wall is spaced radially from the central reference axis a first distance. The inner wall is spaced radially from the central reference axis a second distance less than the first distance. Each vane includes an outer platform, an inner platform spaced apart from the outer platform to establish a gas path radially between the outer platform and the inner platform, and an airfoil integral with the outer platform and the inner platform and extending through the gas path.

In some embodiments, each airfoil includes a metallic support spar fixed to the outer wall and the inner wall and extending radially therebetween, and an airfoil body comprising ceramic matrix composite materials. The airfoil body includes an outer, flow path surface and an opposite, inner body surface facing toward the metallic spar.

In some embodiments, the airfoil body has a first chord length at an inner end of the airfoil body and a second chord length at an outer end of the airfoil body, the second chord length being greater than the first chord length.

In some embodiments, the airfoil body has a third chord length midway between the inner end and the outer end, the third chord length being greater than the first chord length and less than the second chord length.

In some embodiments, the airfoil body has a minimum leading end radius which includes the leading edge of the airfoil body that is constant from the inner end to the outer end of the airfoil body.

In some embodiments, a size of the leading end radius is about 7.5 percent of a size of the first chord length, about 7 percent of the third chord length, and about 6 percent of the second chord length.

In some embodiments, the airfoil body has a maximum thickness between a pressure side of the airfoil body and a suction side of the airfoil body, and wherein the maximum thickness is about 34 percent of the first chord length, about 32.5 percent of the third chord length, and about 31 percent of the second chord length.

In some embodiments, the first chord length is within a range of about 78 percent to about 85 percent of the second chord length.

In some embodiments, the third chord length is within a range of about 85 percent to about 90 percent of the second chord length.

In some embodiments, the second chord length is a maximum chord length of the airfoil body.

In some embodiments, the airfoil body has a first axial chord length at the inner end of the airfoil body and a second axial chord length at the outer end of the airfoil body, the second axial chord length being greater than the first axial chord length.

In some embodiments, the airfoil body has a third axial chord length midway between the inner end and the outer end, the third axial chord length being greater than the first axial chord length and less than the second axial chord length.

In some embodiments, the airfoil body includes an airfoil foundation that surrounds within the gas path and is spaced apart from the support spar by a generally constant distance along the radial height of the airfoil body, a trailing edge filler that provides at least a portion of a trailing edge of the airfoil body, and an overwrap covering the airfoil foundation and the trailing edge filler within the gas path.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
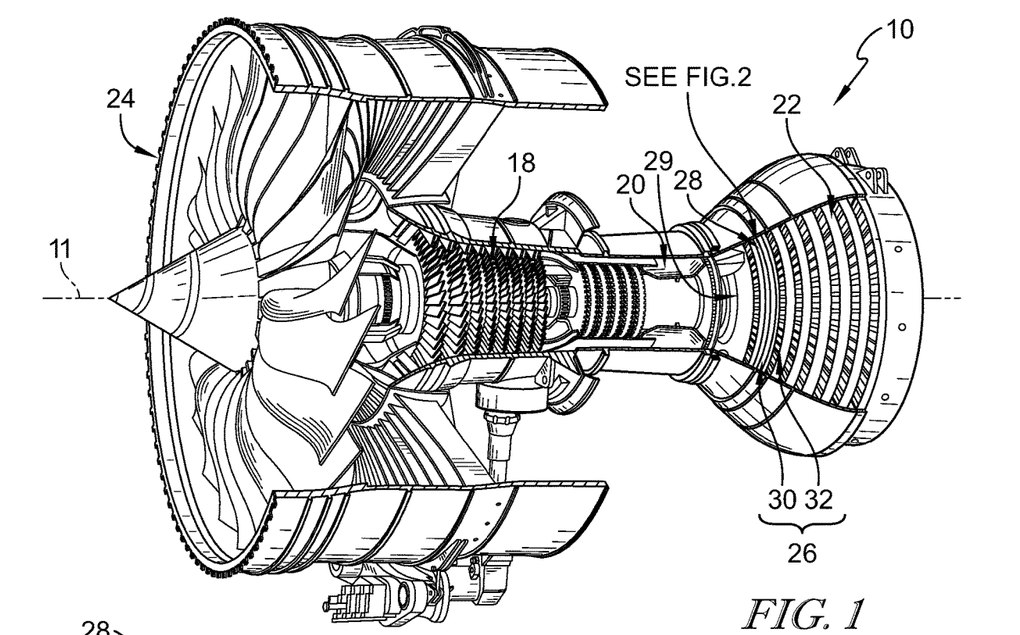
FIG. 1 is a cutaway view of a gas turbine engine that includes a fan, a compressor, a combustor, and a turbine assembly, the turbine assembly including rotating wheel assemblies configured to rotate about an axis of the engine and static turbine vane assemblies configured to direct air toward downstream rotating wheel assemblies.

A gas turbine engine 10, in accordance with the present disclosure, is shown in FIG. 1. The gas turbine engine 10 includes a compressor 18, a combustor 20, and a turbine 22. The compressor 18 is configured to pressurize air and delivers the pressurized air to the combustor 20 during operation. Fuel is injected into the combustor 20 and is ignited with the pressurized air to produce hot, high pressure gases which are discharged from the combustor 20 toward the turbine 22. The hot, high pressure gases drive rotation of rotating components (i.e. blades and disks) in the turbine 22 about a rotation axis 11 which drives rotation of a fan 24 to provide thrust for the gas turbine engine 10.

Figure 2:
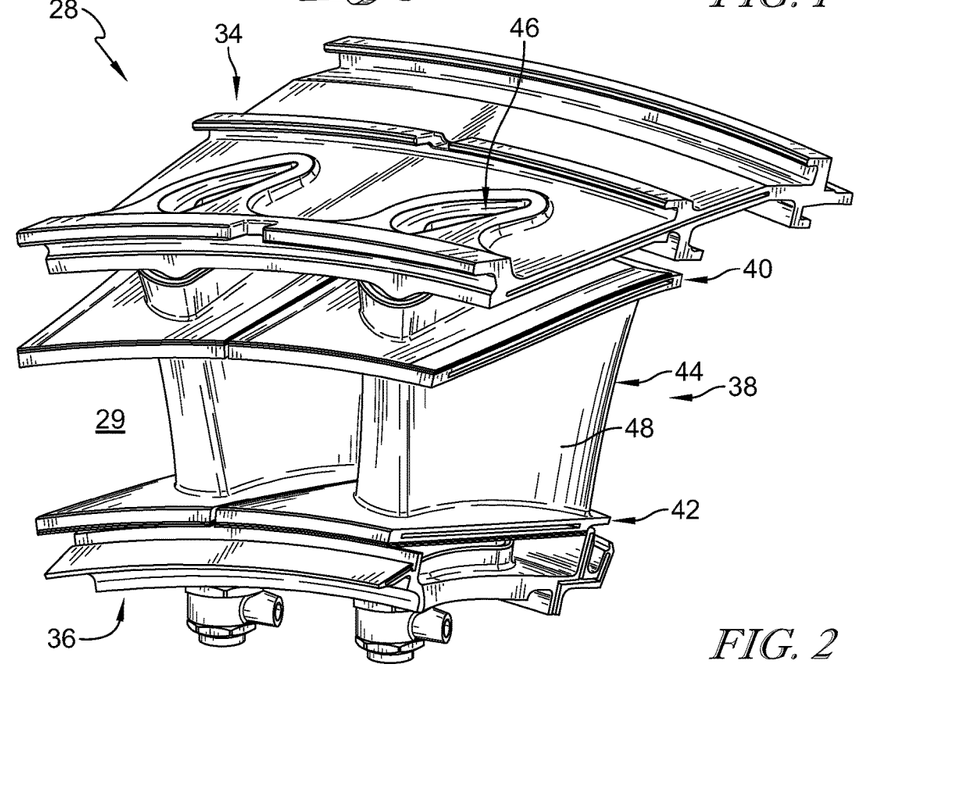
FIG. 2 is a perspective view of a portion of a turbine vane assembly included in the turbine assembly of the gas turbine engine of FIG. 1, the turbine vane assembly including an outer wall, an inner wall, and a plurality of guide vanes that extend between and interconnect the outer wall and the inner wall to define a flow path between the outer wall and the inner wall.

The turbine 22 includes one or more bladed wheel assemblies 26 and one or more vane assemblies 28 as shown in FIGS. 1 and 2. Only a single bladed wheel assembly 26 and a single vane assembly 28 are described below because other assemblies may be substantially similar. The bladed wheel assembly 26 is adapted to interact with gases flowing through a gas path 29 of the gas turbine engine 10 such that the gases push the bladed wheel assembly 26 to rotate about an axis 11 during use of the turbine 18. The vane assembly 28 is located upstream of the bladed wheel assembly 26 and adapted to direct the gases at the bladed wheel assembly 26.

The bladed wheel assembly 26 includes a disk 30 and a plurality of blades 32 as shown in FIG. 1. The disk 30 is arranged around the axis 11. The plurality of blades 32 are coupled with and extend radially from the disk 30. The disk 28 is mounted to a rotating shaft of the gas turbine engine 10 for rotation therewith as the plurality of blades 32 interact with gases in the gas path 29.

Figure 3:
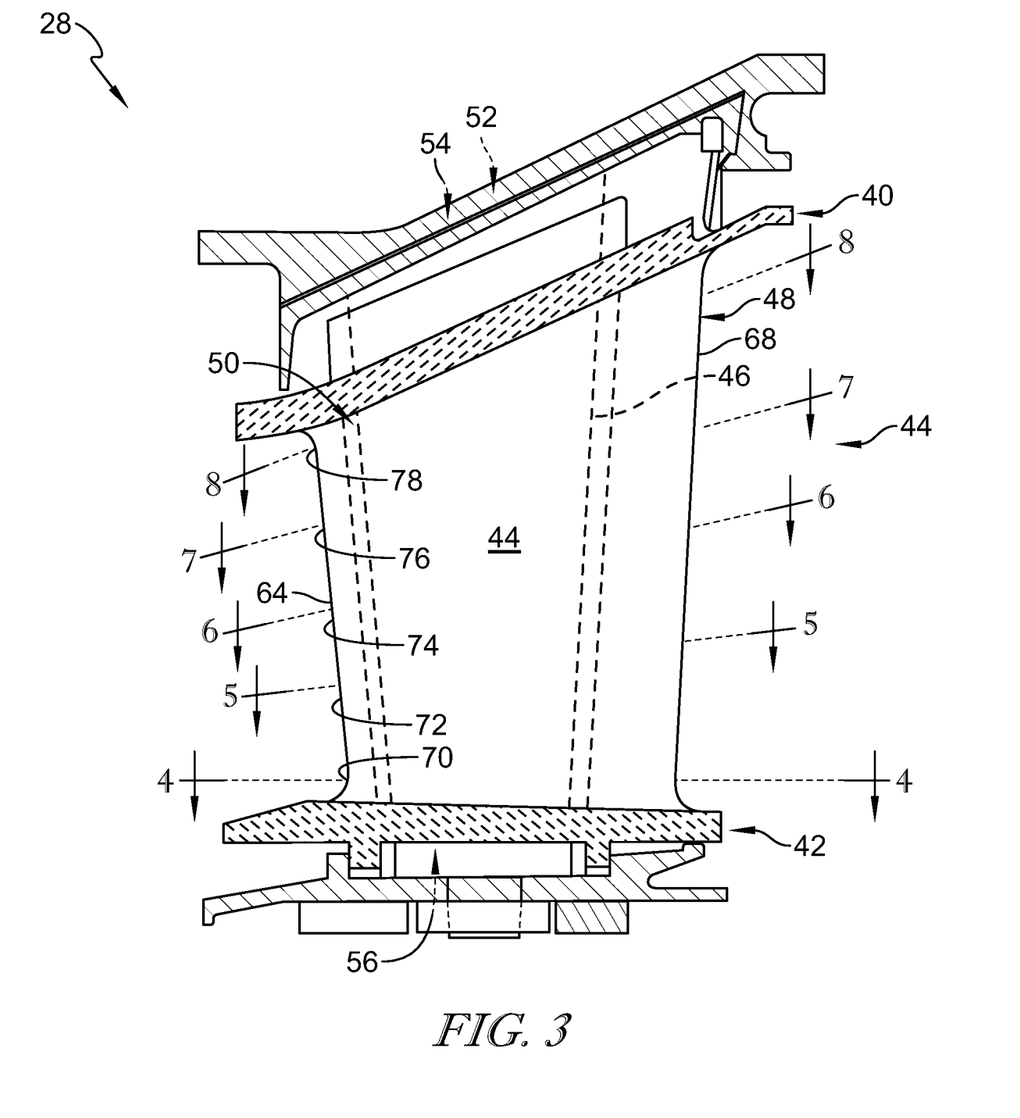
FIG. 3 is a side elevation view of the portion of the turbine vane assembly shown in FIG. 2 and indicators along a radial height of a leading end of the guide vane to indicate where sectional views of FIGS. 4-8 are taken to show various dimensions of the guide vane at each radial height of a leading end of the guide vane shown in FIGS. 4-8.

A portion of one illustrative vane assembly 28 is shown in FIG. 2. The vane assembly 28 includes an outer support 34, an inner support 36, and a plurality of vanes 38 as shown in FIGS. 2 and 3. The outer support 34 is located radially outward of the vanes 38, while the inner support 36 is spaced apart radially from the outer support 34 relative to the axis 11 of the gas turbine engine 10 to locate the vanes 38 radially between. The vanes 38 are arranged between the outer support 34 and the inner support 36 and are positioned to direct gases in gas path 29 toward a bladed wheel assembly 26 with a desired orientation.

Figure 4:
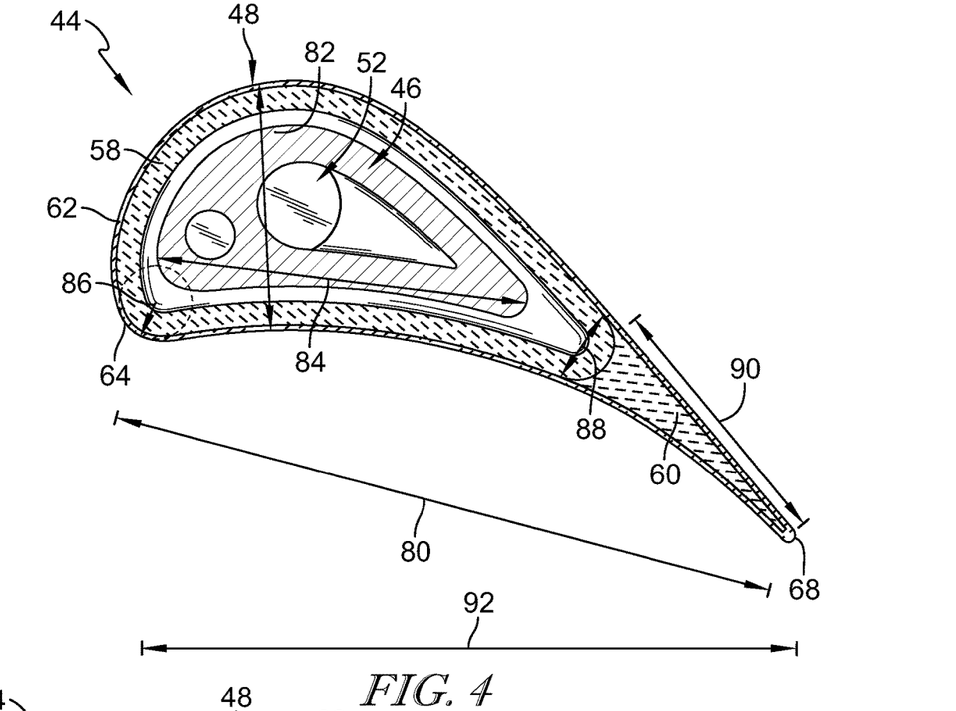
FIG. 4 is a sectional view of the guide vane of FIG. 3 taken at a first point which corresponds to an inner end of the guide vane along the leading end of the guide vane.

Each of the vanes 38 includes an outer platform 40, an inner platform 42, and an airfoil 44 as shown in FIGS. 3 and 4. The inner platform 42 is spaced apart radially from the outer platform 40 relative to the axis 11. The airfoil 44 extends radially between the outer platform 40 and the inner platform 42. In the illustrative embodiment, the outer support 34 is located radially outward of the outer platform 40 and the inner support 36 is located radially inward of the inner platform 42. The outer and inner supports 34, 36 and the outer and inner platforms 40, 42 may be segmented or formed as a full-hoop around axis 11.

Although the airfoil 44 of vane 38 is described herein as being a part of turbine assembly 22, it should be appreciated that the airfoil 44 may be used in other sections of the gas turbine engine 10 such as fan 24 and compressor 18. Accordingly, each airfoil 44 may be referred to as a bladed component for use in various areas of the gas turbine engine 10.

Each airfoil 44 includes a metallic spar 46 and an airfoil body 48 at least partially surrounding the metallic spar 46 as shown in FIGS. 2-8. The spar 46 is coupled to both the outer support 34 and the inner support 36. The airfoil body 48 is illustratively formed from ceramic matrix composite materials (e.g. silicon carbide fibers in silicon carbide matrix). The spar 46 extends through a cavity 50 formed by interior surfaces of the airfoil body 48 as suggested in FIG. 3 and shown in FIG. 4.

The ceramic matrix composite materials forming the airfoil body 48 may include a plurality of plies and/or preforms with ceramic-containing fibers. The plurality of plies and/or preforms may be laid-up relative to one another and then infiltrated with ceramic matrix material to integrate the plies with one another and form a one-piece ceramic matrix composite airfoil body 48. The plurality of plies and/or preforms may be shaped to block axial movement of the airfoil body 48 and the platforms 40, 42 relative to the spar 46.

The spar 46 is illustratively formed as a metallic tube with one or more hollow cavities 52 that extend all the way or partway through the spar 46 from a first end 54 to a second end 56 as shown in FIGS. 2 and 3. The first end 54 and the second end 56 are spaced axially from both the outer and inner end walls 16, 18 such that the spar 46 extends axially past the inner and outer supports 34, 36, respectively, in both axial directions. The spar 46 is configured to reinforce the airfoil body 48 by supporting loads caused by differential pressures between the gas path 29 and the hollow cavity 52. In some embodiments, the spar 46 may be formed without a hollow cavity 52.

The airfoil body 48 is coupled with the spar 46 between the outer end wall 16 and the inner end wall 18 as shown in FIGS. 1 and 2. The airfoil body 48 includes an airfoil foundation 58 that at least partially covers the spar 46 from the gas path 29, a trailing edge filler 60 that provides at least a portion of a trailing edge of the airfoil body 48, and an optional overwrap 62 covering the airfoil foundation 58 and the trailing edge filler 60.

In the illustrative embodiment, the airfoil foundation 58 is formed as a tube or a folded sheet that completely surrounds the spar 46 between platforms 40, 42 within the gas path 29. The airfoil foundation 58 is spaced apart from the support spar 46 an equal and constant distance along a radial height of the airfoil body 48 to facilitate formation of the airfoil body 48 and insertion of the spar 46 into the airfoil body 48. The airfoil 44 is also formed without any structures interconnecting the spar 46 and the airfoil body 48 to aid in inserting the spar 46 through the airfoil body 48 during assembly by accommodating slight twisting of the airfoil body 48 along the radial height. The airfoil foundation 58 may be integral with and form a part of each of the platforms 40, 42. The tube or sheet forming the airfoil foundation 58 may be a single or multiple ply preform with a two-dimensional, a two and one-half dimensional, or a three-dimensional construction.

The trailing edge filler 60 is formed as an insert or a noodle (i.e. loose strands of reinforcement fibers in matrix material) that is positioned between the airfoil foundation 58 and the overwrap 62 at a trailing edge of the airfoil body 48. The overwrap 62 may include a tube or sheet (i.e. a ply) of ceramic matrix composite material, a layer of environmental barrier material, or any other suitable component to surround and join the airfoil foundation 58 and the trailing edge filler 60. In some embodiments, the overwrap 62 may be omitted and the airfoil foundation 58 and the trailing edge filler 60 may be integrated together during a ceramic matrix composite forming process to form the airfoil body 48.

Each airfoil body 48 is substantially similar for any given stage of the turbine 22. A cross sectional shape of the airfoil body 48 changes over a radial height of the airfoil body 48 to optimize turning of the air and thereby increase an efficiency of the turbine 22. The cross sectional shape of the airfoil body 48 is also shaped to accommodate the ceramic matrix composite materials of the airfoil body 48 and the metallic materials of the support spar 46 while structurally supporting the airfoil 44 in the gas turbine engine 10. Cross sections are taken along various points along the radial height of the airfoil body 48 along a leading end 64 as shown in FIGS. 3-8.

Figure 5:
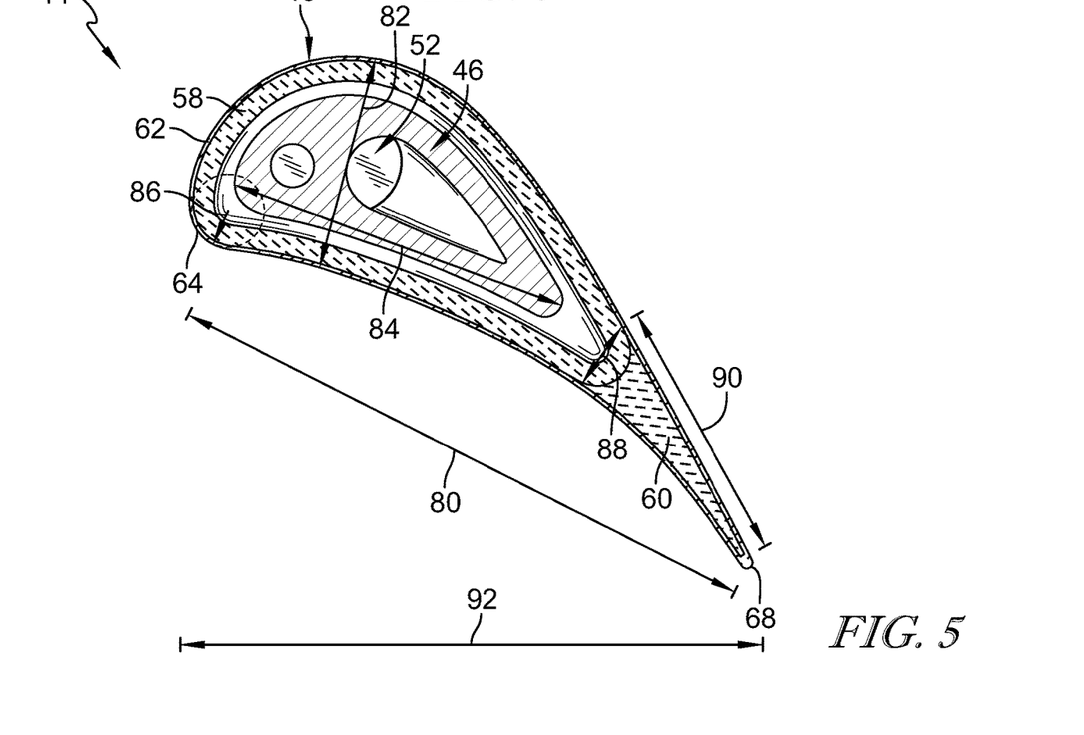
FIG. 5 is a sectional view of the guide vane taken along line 5-5 in FIG. 3 which corresponds to a second point along the leading end of the guide vane that is spaced apart from the first point by a one-quarter distance of the radial height from the first point.
Figure 6:
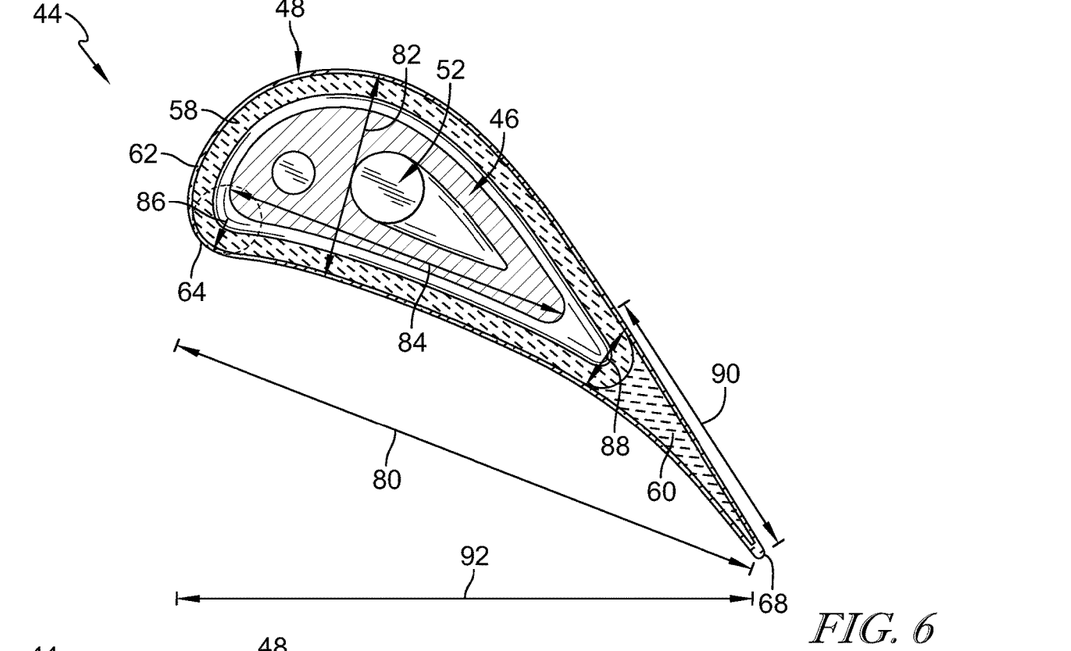
FIG. 6 is a sectional view of the guide vane taken along line 6-6 in FIG. 3 which corresponds to a third point along the leading end of the guide vane that is spaced apart from the first point by a one-half distance of the radial height from the first point.
Figure 7:
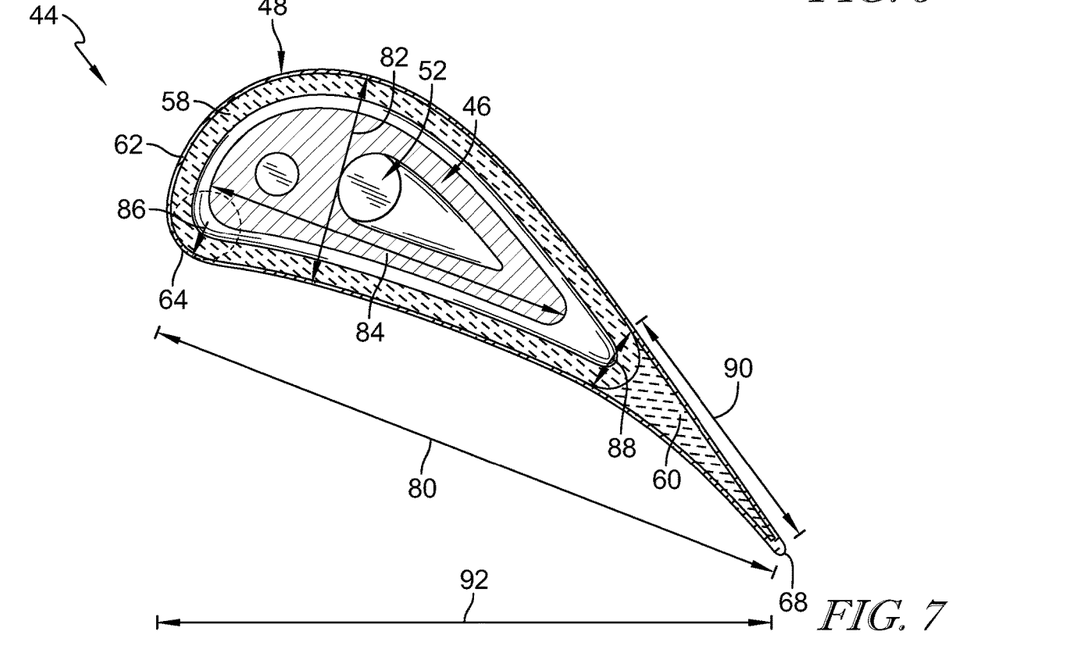
FIG. 7 is a sectional view of the guide vane taken along line 7-7 in FIG. 3 which corresponds to a fourth point along the leading end of the guide vane that is spaced apart from the first point by a three-fourths distance of the radial height from the first point.
Figure 8:
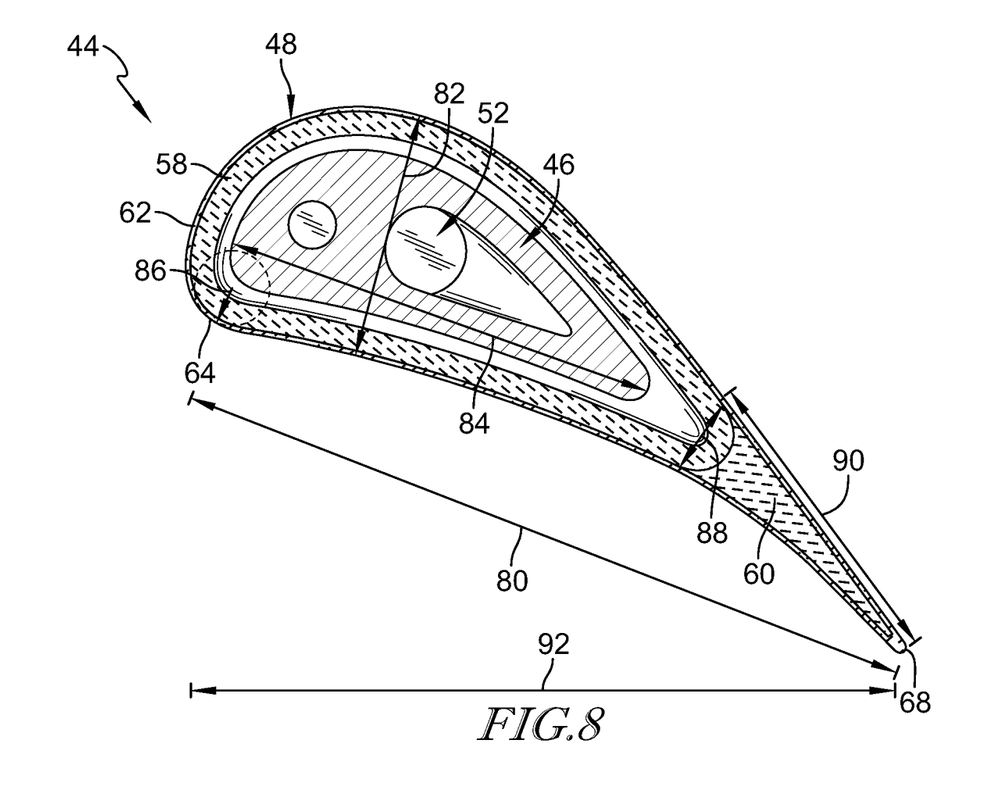
FIG. 8 is a sectional view of the guide vane taken along line 8-8 in FIG. 3 which corresponds to a fifth point along the leading end of the guide vane that is located at an outer end of the guide vane to define the radial height between the first point and the fifth point.

FIG. 4 shows a sectional view of the airfoil body 48 taken at a first point 70 which corresponds to a radial innermost end of the airfoil 44 along the leading end 64. FIG. 5 shows a sectional view taken at a second point 72 that is spaced apart from the first point 70 by a one-quarter distance of the radial height of the leading end 64 from the first point 70. FIG. 6 is a sectional view taken at a third point 74 that is spaced apart from the first point 70 by a one-half distance of the radial height of the leading end 64 from the first point 70. FIG. 7 is a sectional view taken at a fourth point 76 that is spaced apart from the first point 70 by a three-fourths distance of the radial height of the leading end 64 from the first point 70. FIG. 8 is a sectional view taken at a fifth point 78 that is located at a radial outermost end of leading end 64 to define the radial height between the first point 70 and the fifth point 78.

The airfoil body 48 has a chord length 80 defined between the leading end 64 and a trailing end 68 of the airfoil body 48 in an axial direction. The airfoil body 48 further includes a maximum thickness 82 in a circumferential direction. The support spar 46 includes a chord length 84 in the axial direction. The leading end 64 of the airfoil body 48 has a minimum leading end radius 86. The trailing end filler has a maximum thickness 88 in the circumferential direction and a length 90 in the axial direction. The airfoil body 48 has an axial length 92 parallel to axis 11. Each of these dimensions varies over the radial height of the airfoil 44 relative to one another to optimize turning of the air in the turbine 22 and accommodate the ceramic matrix composite materials of the airfoil body 48 and the metallic materials of the support spar 46 while structurally supporting the airfoil 44 in the gas turbine engine 10.

Table 1 shows a relationship between the leading end (LE) radius 86 compared to the chord length 80 and the axial length 92 at each point 70, 72, 74, 76, 78. The absolute dimension of the leading edge radius 86 is constant at each point 70, 72, 74, 76, 78 in the illustrative embodiment. The chord lengths 80, 92 change relative to the minimum leading edge radius 86 to cause the leading edge radius 86 percentages to vary as compared to the chord lengths 80, 92. In some embodiments, the leading end radius 86 is within a range of 6 percent to 8 percent of all chord lengths 80 between the inner end and the outer end.

TABLE 1

| LE radius 86 | % of chord length 80 | % of axial chord length 92 |
|---|---|---|
| Point 70 | 7.58 | 10.69 |
| Point 72 | 7.38 | 10.38 |
| Point 74 | 7.12 | 10.00 |
| Point 76 | 6.74 | 9.47 |
| Point 78 | 6.31 | 8.88 |

A comparable metallic vane is described using similar tables to those provided above. Table 2 compares a leading edge radius of the metallic vane to a chord length and an axial length of the metallic vane at points corresponding to points 70, 76, 78 of airfoil 44 above.

TABLE 2

| LE radius | % of chord length | % of axial chord length |
|---|---|---|
| Point 70 | 7.78 | 10.74 |
| Point 72 | — | — |
| Point 74 | 8.50 | 9.88 |
| Point 76 | — | — |
| Point 78 | 6.88 | 9.74 |

Table 3 shows a relationship between the maximum thickness 82 of the airfoil body 48 compared to the chord length 80 and the axial length 92 of the airfoil body 48 at each point 70, 72, 74, 76, 78. In some embodiments, the maximum thickness 82 is within a range of 30 percent to 35 percent of all chord lengths 80 between the inner end and the outer end. It should be noted that the maximum thickness 82 is provided, at least in part, by a thickness of the airfoil body 48 being substantially constant between an outer, flow path surface and an inner cavity surface facing toward the spar 46. This facilitates manufacturing of the airfoil 44 by allowing tools or mandrels to be removed from the inner cavity surface of the airfoil body 48.

TABLE 3

| Thickness 82 | % of chord length 80 | % of axial chord length 92 |
|---|---|---|
| Point 70 | 34.25 | 48.34 |
| Point 72 | 33.63 | 47.32 |

TABLE 3-continued

| Thickness 82 | % of chord length 80 | % of axial chord length 92 |
|---|---|---|
| Point 74 | 32.50 | 45.65 |
| Point 76 | 31.36 | 44.07 |
| Point 78 | 31.03 | 43.68 |

Table 4 compares a max thickness of the comparable metallic vane to the chord length and the axial length of the metallic vane at points corresponding to points 70, 76, 78 of airfoil 44 above.

TABLE 4

| Thickness | % of chord length | % of axial chord length |
|---|---|---|
| Point 70 | 30.87 | 42.63 |
| Point 72 | — | — |
| Point 74 | 35.36 | 41.11 |
| Point 74 | — | — |
| Point 78 | 28.66 | 39.42 |

Table 5 shows a relationship between the chord length 80 at a given point and the maximum chord length 80 (which occurs at radial outermost point 78) of the airfoil body 48 at each point 70, 72, 74, 76, 78.

TABLE 5

| Chord Length 80 | % of max chord length |
|---|---|
| Point 70 | 83.26 |
| Point 72 | 85.52 |
| Point 74 | 88.57 |
| Point 76 | 93.59 |
| Point 78 | 100.00 |

Table 6 compares the chord length of the comparable metallic vane to a maximum chord length of the metallic vane at points corresponding to points 70, 76, 78 of airfoil 44 above.

TABLE 6

| Chord Length | % of max chord length |
|---|---|
| Point 70 | 87.4 |
| Point 72 | — |
| Point 74 | 80.80 |
| Point 76 | — |
| Point 78 | 100 |

Table 7 shows a relationship between the axial chord length 92 and the maximum axial chord length of the airfoil body 48 at each point 70, 72, 74, 76, 78.

TABLE 7

| Axial Length 92 | % of max axial chord length |
|---|---|
| Point 70 | 83.06 |
| Point 72 | 85.58 |
| Point 74 | 88.78 |

TABLE 7-continued

| Axial Length 92 | % of max axial chord length |
|---|---|
| Point 76 | 93.75 |
| Point 78 | 100.00 |

Table 8 compares the axial length of the comparable metallic vane to a maximum axial length of the metallic vane at points corresponding to points 70, 76, 78 of airfoil 44 above.

TABLE 8

| Axial Length | % of max chord length |
|---|---|
| Point 70 | 87.1 |
| Point 72 | — |
| Point 74 | 95.6 |
| Point 76 | — |
| Point 78 | 100 |

As indicated in the values above, the chord length 80, maximum thickness 82, spar length 84, and leading end radius 86 increase from point 70 to point 78. This allows the support spar 46 to be inserted through the airfoil body 48 during assembly from a radially outer end of the airfoil body 48 and twisting of the spar 46 as it is inserted into the airfoil body 48 to follow the shape of the airfoil body 48. At the same time, this also allows the airfoil body to be shaped in a way that optimizes turning of the air in the turbine 22. In some embodiments, the values shown above may vary by plus or minus 1 percent (i.e. about 83 percent may be a range between 82-84 percent). The spar 46 may not fit with the airfoil body 48 or adequately support the airfoil body 48 if there are increasing and decreasing values between points 70 and 78 or twisting of the airfoil body 48 in more than one direction, for example.

In the illustrative embodiment, the trailing edge filler length 90 extends from the trailing end filler maximum thickness 88 to the trailing edge 68. The trailing edge filler maximum thickness 88 is defined at a portion of the airfoil body 48 below 10 millimeters thickness. Accordingly, the maximum thickness 88 remains unchanged from point 70 to point 78. The trailing edge filler length 90 also remains generally unchanged from the point 70 to the point 78. Spar length 84 is maximized while trailing edge filler length 90 is kept generally constant to maximize support of the airfoil 44 while allowing the support spar 46 to be inserted into the airfoil body 48 without changing the spacing between the spar 46 and the inside surfaces of the airfoil body 48. Table 9 shows relationship between the trailing edge filler length 90 compared to the chord length 80 and the axial cord length 92 at points 70 and 78.

TABLE 9

| Trailing Edge Filler Length 90 | % of Chord Length 80 | % of Axial Length 92 |
|---|---|---|
| Point 70 | 41 | 42 |
| Point 72 | — | — |
| Point 74 | 35 | 38 |
| Point 76 | — | — |
| Point 78 | 28 | 22 |

Figure 9:
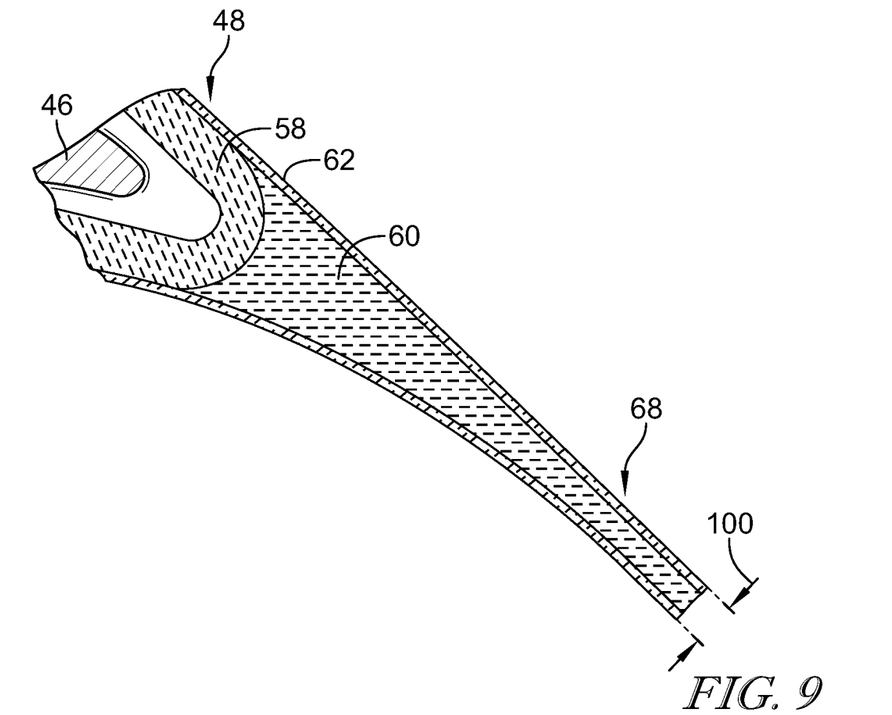
FIG. 9 is a sectional view of a tail end of an airfoil preform showing that the tail end may be initially formed with a longer length and then subsequently trimmed to have a constant width trailing end as shown in FIG. 10.
Figure 10:
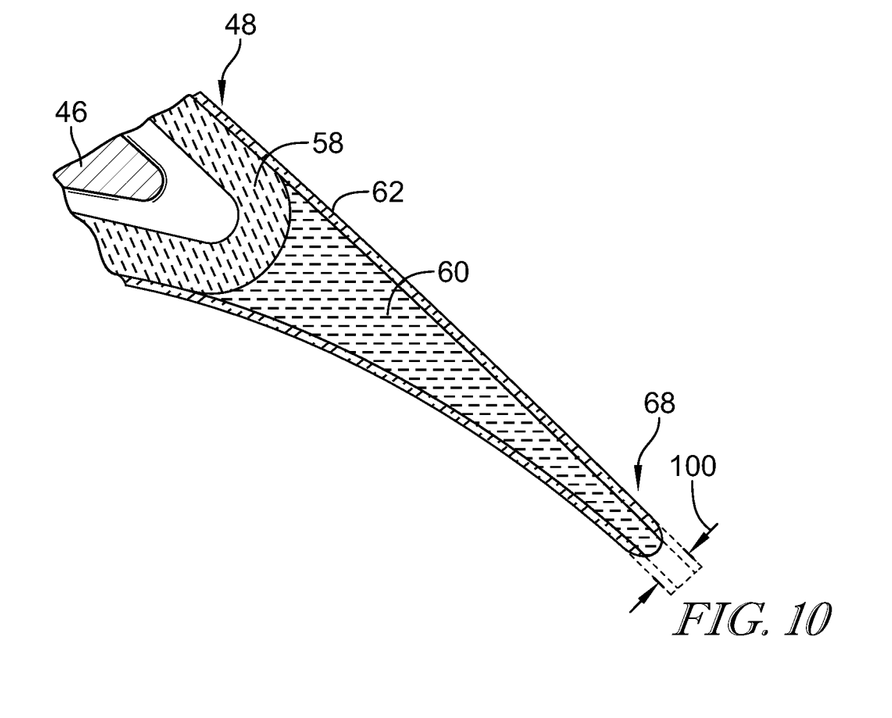
FIG. 10 is a sectional view of the tail end after being trimmed from the initial length shown in FIG. 9.

The trailing end 68 of the airfoil body 48 may initially have a longer length prior to forming the final shape of the airfoil body 48 as shown in FIG. 9. The trailing end 68 has a width 100 that remains substantially unchanged after the trailing end 68 is trimmed to form the final shape of the airfoil body 48 as suggested in FIG. 10. The trailing edge filler 60 and, if included, the overwrap 62 are sized to have an integer number of plys or fibers so that when the trailing edge 68 is trimmed, no ply or fiber is disrupted to maintain structural integrity of all of the plys or fibers.

In some embodiments, the present disclosure provides relationships for designing ceramic matrix composite airfoils against various structural and manufacturing constraints. The present disclosure includes a vane with staggered angle variation over span defined by variation in flow turning over span. In some embodiments, the vane has higher flow turning towards its root compared to its tip. In some embodiments, it may be desirable to reduce a chord length of the vane to keep wetted area down (reduce cooling requirement), and reduce weight. However, this may require a balance against increased Mach number (Mn) (higher aerodynamic loss) and lift coefficient of a low chord design.

In some embodiments, the outer end of the vane has greater spacing (S) between the vanes at their tips. This may require a greater chord length (C) at the tip to maintain a reasonable spacing/chord length ratio over radial height of the vanes, which is directly related to the lift coefficient and peak Mach number. Additionally, having reduced flow turning and a steep increase in annulus line at the tip of the vane increases the vanes lift coefficient at the tip. This may require further chord increase at the tip to keep lift coefficient within limits, and can effectively set the chord length at the tip. The low stagger angle (low turning) at the tip may result in lower peak Mach numbers at this location, which is good for aerodynamic loss.

In some embodiments, the inner end of each vane has a smaller chord length than the outer end. Each vane may include a stack taper in one direction only (or constant section over stack). This results in decreasing chord from tip (outer end) to root (inner end). The inner end also has a higher stagger angle compared to the outer end.

In some embodiments, the vane has a thickness that increases the metallic strut (metallic spar 46) structural capability. To achieve an acceptable life in the metal spar, the spar is sized to be larger than a typical metallic nozzle guide vane (NGV) internal cavity. In some embodiments, the minimum thickness of the aerodynamic definition is at least 20 millimeters, in contrast, a typical metal nozzle guide vane may have a minimum thickness of about 15 millimeters. To achieve this, the airfoil count in the nozzle guide vane stage is reduced, with a corresponding increase in chord for each vane included in the stage.

In some embodiments, the airfoil shape of each vane mitigates structural constraints then can be encountered by ceramic matrix composite materials. ceramic matrix composite parts are typically manufactured with ceramic fibers, tows, or fabrics applied to a tool. On consolidation, the tool is extracted from the ceramic matrix composite structure. It is conceivable that complex multi-piece or in-situ removal can be applied. Alterative ceramic matrix composite construction approaches are possible, for example a 3D woven pre-form or 1-dimensional tape applied directly to tooling.

In some embodiments, the change in airfoil thickness and chord can be as aggressive as desired, as long as the change is in one direction only (i.e. with radial height, the part gets thicker but not thicker then thinner). Similarly, the part can incorporate twist (i.e. airfoil section stagger angle) and skew (i.e. airfoil section rotation) but only in one direction between the inner end and outer end of the airfoil body 48. In some embodiments, the LE radius may be at least 5.4 millimeters which is a larger radius as compared to other typical metallic components.

In some embodiments, the length of the metal spar may be maximized relative to the interior cavity of the airfoil body and at the same time, the length of the trailing edge filler may be minimized. The trailing edge region is defined as the portion of the airfoil below 10 millimeters thickness. The length of the trailing edge filler may remain generally unchanged across the radial height of the vane to ease manufacturing of the filler and potentially allow a 3D woven extrusion to be applied. In some embodiments, the leading end radius is fixed at 5.4 millimeters.

The airfoil trailing edge can be machined so that it does not follow a straight, two dimensional profile. However, a thickness of the trailing end is kept constant to minimize machining ceramic matrix composite plies. Furthermore, in some embodiments, it is advantageous to design the thickness of a ceramic matrix composite trailing edge to be close to an integer number of consolidated plies (also accounting for the external coating thicknesses). It may be helpful to pre-form the trailing edge beyond the desired length but with constant thickness and then machine the trailing edge back to the intended aerodynamic shape as suggested in FIGS. 9 and 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly extending circumferentially around a central reference axis of a gas turbine engine, the vane assembly comprising an outer wall spaced radially from the central reference axis a first distance, an inner wall spaced radially from the central reference axis a second distance less than the first distance, and a plurality of vanes extending radially between the outer wall and the inner wall, each vane including an outer platform, an inner platform spaced apart from the outer platform to establish a gas path radially between the outer platform and the inner platform, and an airfoil integral with the outer platform and the inner platform and extending through the gas path, each airfoil including:

a metallic support spar fixed to the outer wall and the inner wall and extending radially therebetween, and an airfoil body comprising ceramic matrix composite materials, the airfoil body including an outer, flow path surface and an opposite, inner body surface facing toward the metallic support spar, wherein the airfoil body has a first chord length at an inner end of the airfoil body and a second chord length at an outer end of the airfoil body, the second chord length being greater than the first chord length, and wherein the airfoil body has a third chord length midway between the inner end and the outer end, the third chord length being greater than the first chord length and less than the second chord length, and wherein the airfoil body has a minimum leading end radius which includes the leading edge of the airfoil body that is constant from the inner end to the outer end of the airfoil body.

2. The vane assembly of claim 1, wherein a size of the leading end radius is about 7.5 percent of a size of the first chord length, about 7 percent of the third chord length, and about 6 percent of the second chord length.

3. The vane assembly of claim 1, wherein the airfoil body has a maximum thickness between a pressure side of the airfoil body and a suction side of the airfoil body, and wherein the maximum thickness is about 34 percent of the first chord length, about 32.5 percent of the third chord length, and about 31 percent of the second chord length.

4. The vane assembly of claim 1, wherein the first chord length is within a range of about 78 percent to about 85 percent of the second chord length.

5. The vane assembly of claim 4, wherein the third chord length is within a range of about 85 percent to about 90 percent of the second chord length.

6. The vane assembly of claim 5, wherein the second chord length is a maximum chord length of the airfoil body.

7. The vane assembly of claim 1, wherein the airfoil body has a first axial chord length at the inner end of the airfoil body and a second axial chord length at the outer end of the airfoil body, the second axial chord length being greater than the first axial chord length, and
wherein the airfoil body has a third axial chord length midway between the inner end and the outer end, the third axial chord length being greater than the first axial chord length and less than the second axial chord length.

8. The vane assembly of claim 1, wherein the airfoil body includes an airfoil foundation that surrounds within the gas path and is spaced apart from the metallic support spar by a constant distance along the radial height of the airfoil body, a trailing edge filler that provides at least a portion of a trailing edge of the airfoil body, and an overwrap covering the airfoil foundation and the trailing edge filler within the gas path.

9. The vane assembly of claim 8, wherein the trailing edge filler includes a trailing edge filler length that is constant from the inner end to the outer end.

10. A vane assembly extending circumferentially around a central reference axis, the vane assembly comprising an outer wall spaced radially from the central reference axis a first distance, an inner wall spaced radially from the central reference axis a second distance less than the first distance, and
a plurality of airfoils extending through a gas path, each airfoil including:
a metallic support spar fixed to the outer wall and the inner wall and extending radially therebetween, and
an airfoil body comprising ceramic matrix composite materials, the airfoil body including an outer, flow path surface and an opposite, inner body surface facing toward the metallic support spar, wherein the airfoil body has a first chord length at an inner end of the airfoil body and a second chord length at an outer end of the airfoil body, the second chord length being greater than the first chord length, wherein the airfoil body has a third chord length midway between the inner end and the outer end, the third chord length being greater than the first chord length and less than the second chord length, and
wherein the airfoil body has a leading end radius that is constant from the inner end to the outer end of the airfoil body.

11. The vane assembly of claim 10, wherein the leading end radius is within a range of about 6 percent to about 8 percent of the first, second, and third chord lengths between the inner end and the outer end.

12. The vane assembly of claim 10, wherein the airfoil body has a maximum thickness between a pressure side of the airfoil body and a suction side of the airfoil body, and wherein the maximum thickness is within a range of about 30 percent to about 35 percent of the first, second, and third chord lengths between the inner end and the outer end.

13. The vane assembly of claim 10, wherein the first chord length is within a range of about 78 percent to about 85 percent of the second chord length.

14. The vane assembly of claim 13, wherein the third chord length is within a range of about 85 percent to about 90 percent of the second chord length.

15. The vane assembly of claim 14, wherein the second chord length is a maximum chord length of the airfoil body.

16. The vane assembly of claim 10, wherein the airfoil body has a first axial chord length at the inner end of the airfoil body and a second axial chord length at the outer end of the airfoil body, the second axial chord length being greater than the first axial chord length, and
wherein the airfoil body has a third axial chord length midway between the inner end and the outer end, the third axial chord length being greater than the first axial chord length and less than the second axial chord length.

17. A vane assembly extending circumferentially around a central reference axis, the vane assembly comprising an outer wall spaced radially from the central reference axis a first distance, an inner wall spaced radially from the central reference axis a second distance less than the first distance, and
a plurality of airfoils extending through a gas path, each airfoil including:
a metallic support spar fixed to the outer wall and the inner wall and extending radially therebetween, and
an airfoil body comprising ceramic matrix composite materials, the airfoil body including an outer, flow path surface and an opposite, inner body surface facing toward the metallic support spar, wherein the airfoil body has a first chord length at an inner end of the airfoil body and a second chord length at an outer end of the airfoil body, the second chord length being greater than the first chord length, wherein the airfoil body has a third chord length midway between the inner end and the outer end, the third chord length being greater than the first chord length and less than the second chord length, and
wherein the airfoil body includes an airfoil foundation that surrounds the metallic support spar within the gas path and is spaced apart from the metallic support spar to establish a constant distance between the airfoil foundation and the metallic support spar between the inner end and the outer end, a trailing edge filler that provides at least a portion of a trailing edge of the airfoil body, and an overwrap covering the airfoil foundation and the trailing edge filler within the gas path, and wherein the trailing edge filler includes a trailing edge filler length that is constant from the inner end to the outer end.

18. The vane assembly of claim 17, wherein a length of the metallic support spar increases constantly from the inner end to the outer end.

19. The vane assembly of claim 18, wherein the airfoil body has a first axial chord length at the inner end of the airfoil body and a second axial chord length at the outer end of the airfoil body, the second axial chord length being greater than the first axial chord length, and wherein the airfoil body has a third axial chord length midway between the inner end and the outer end, the third axial chord length being greater than the first axial chord length and less than the second axial chord length.

20. The vane assembly of claim 17, wherein the airfoil body has a leading end radius that is constant from the inner end to the outer end of the airfoil body.

* * * * *